(12) United States Patent
Evans

(10) Patent No.: US 7,733,908 B1
(45) Date of Patent: Jun. 8, 2010

(54) CROSS-LAYER ARCHITECTURE FOR A NETWORK DEVICE

(75) Inventor: Gregory Morgan Evans, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1020 days.

(21) Appl. No.: 11/443,882

(22) Filed: May 31, 2006

(51) Int. Cl.
    *H04J 3/22* (2006.01)
(52) U.S. Cl. .................. 370/469; 370/389
(58) Field of Classification Search .................. 370/338, 370/389, 352, 465, 469; 709/201, 202, 223, 709/224, 225, 230, 232, 238, 240
See application file for complete search history.

(56) References Cited

U.S. PATENT DOCUMENTS

| | | | |
|---|---|---|---|
| 6,470,389 B1 * | 10/2002 | Chung et al. | 709/227 |
| 6,721,282 B2 | 4/2004 | Motley | |
| 6,987,985 B2 | 1/2006 | Purkayastha et al. | |
| 7,016,668 B2 | 3/2006 | Vaidyanathan et al. | |
| 7,356,013 B2 * | 4/2008 | Linder et al. | 370/338 |
| 2002/0010759 A1 | 1/2002 | Hitson et al. | |
| 2002/0013812 A1 | 1/2002 | Krueger et al. | |
| 2002/0054578 A1 | 5/2002 | Zhang et al. | |
| 2002/0061029 A1 | 5/2002 | Dillon | |
| 2002/0104099 A1 | 8/2002 | Novak | |
| 2002/0129367 A1 | 9/2002 | Devara | |
| 2002/0144267 A1 | 10/2002 | Gutta et al. | |
| 2002/0156842 A1 | 10/2002 | Signes et al. | |
| 2003/0050055 A1 | 3/2003 | Ting et al. | |
| 2003/0081580 A1 | 5/2003 | Vaidyanathan et al. | |
| 2003/0152096 A1 | 8/2003 | Chapman | |
| 2003/0161268 A1 | 8/2003 | Larsson et al. | |
| 2004/0009751 A1 * | 1/2004 | Michaelis et al. | 455/62 |
| 2004/0030798 A1 | 2/2004 | Anderson et al. | |

(Continued)

FOREIGN PATENT DOCUMENTS

GB        2 306 869 A       11/1995

OTHER PUBLICATIONS

Eric Setton et al., "Cross-Layer Design of Ad Hoc Networks for Real-Time Video Streaming," (article), Aug. 2005, pp. 99-102, vol. 12, issue 4, IEEE Wireless Communications.

(Continued)

*Primary Examiner*—Ricky Ngo
*Assistant Examiner*—Wei-Po Kao
(74) *Attorney, Agent, or Firm*—Withrow & Terranova, PLLC

(57) ABSTRACT

A cross-layer architecture for a network device having a number of network interfaces is provided. Each of the network interfaces implements a number of low level layers of a protocol stack and includes an associated network based cross-layer agent. The network device also includes an application based cross-layer agent associated with one or more high level protocol stack layers including an application layer. When the application layer desires to form a network connection to another network device, an arbitration agent operates to identify one of the network interfaces for the network connection. The arbitration agent then effects interconnection of the application based cross-layer agent and the network based cross-layer agent of the network interface and interconnection of the high level protocol stack layers and the low level protocol stack layers of the network interface, thereby forming a complete protocol stack having a cross-layer architecture for the network connection.

14 Claims, 4 Drawing Sheets

U.S. PATENT DOCUMENTS

| | | |
|---|---|---|
| 2004/0042421 A1 | 3/2004 | Mahany |
| 2004/0117824 A1 | 6/2004 | Karaoguz et al. |
| 2004/0248615 A1 | 12/2004 | Purkayastha et al. |
| 2004/0264372 A1 | 12/2004 | Huang |
| 2005/0008017 A1 | 1/2005 | Datta et al. |
| 2005/0034001 A1 | 2/2005 | Pontarelli |
| 2005/0108769 A1 | 5/2005 | Arnold et al. |
| 2005/0120127 A1 | 6/2005 | Bradley et al. |
| 2005/0169632 A1 | 8/2005 | Song et al. |
| 2005/0183120 A1 | 8/2005 | Jain et al. |
| 2005/0192987 A1 | 9/2005 | Marsh |
| 2005/0201340 A1 | 9/2005 | Wang et al. |
| 2005/0216942 A1 | 9/2005 | Barton |
| 2005/0239497 A1 | 10/2005 | Bahl et al. |
| 2005/0286438 A1 | 12/2005 | Rajkotia |
| 2006/0048185 A1 | 3/2006 | Alterman |
| 2006/0048186 A1 | 3/2006 | Alterman |
| 2006/0053452 A1 | 3/2006 | Lee et al. |
| 2006/0056349 A1 | 3/2006 | Nakatugawa et al. |
| 2006/0085830 A1 | 4/2006 | Bruck et al. |
| 2006/0129672 A1 | 6/2006 | Mayer |
| 2006/0182101 A1 * | 8/2006 | Hoekstra et al. ............ 370/389 |
| 2006/0206933 A1 | 9/2006 | Molen et al. |
| 2007/0002742 A1 | 1/2007 | Krishnaswamy et al. |
| 2007/0008978 A1 * | 1/2007 | Pirzada et al. ......... 370/395.43 |
| 2007/0061488 A1 | 3/2007 | Alagappan et al. |
| 2007/0061580 A1 | 3/2007 | Venkatesan et al. |

OTHER PUBLICATIONS

No Author, "PC Connection," (website), 2006, 2 pages, http://www.pcconnection.com/ProductDetail?sku=5373172&SourceID=k40132.

Vijay T. Raisinghani et al., "ECLAIR: An Efficient Cross Layer Architecture for Wireless Protocol Stacks," 5th World Wireless Congress, San Francisco, CA, May 25-28, 2004.

Vineet Srivastava et al., "Cross-Layer Design: A Survey and the Road Ahead," IEEE Communications Magazine, pp. 112-119, Dec. 2005.

* cited by examiner

CROSS-LAYER ARCHITECTURE FOR A NETWORK DEVICE

FIELD OF THE INVENTION

The present invention relates to a cross-layer architecture for a network device, and more specifically relates to a cross-layer architecture for a network device having multiple applications and network interface cards.

BACKGROUND OF THE INVENTION

In the classic seven layer Open Systems Interconnection (OSI) protocol stack for networking, communication and data sharing is restricted to adjacent layers in the protocol stack. The OSI protocol stack assumes a somewhat static performance of the low level protocol layers, such as the Media Access Control (MAC) layer and the physical layer (PHY). However, in wireless networks where the performance of the low level protocol layers and specifically the physical layer (PHY) is dynamic, the classic OSI protocol stack is not optimal. Changes in performance at the physical layer (PHY) result in rippling effects in the higher layers of the protocol stack. For example, as packets are dropped over an error prone wireless link, the Transmission Control Protocol (TCP) layer assumes network congestion at the Internet Protocol (IP) layer or high traffic loads within the network router. In response, the TCP layer overcompensates by slowing transmission rates.

Due to the non-optimal performance of the classic OSI model in wireless networks, cross-layering has emerged as a viable approach to gaining network performance. In general, cross-layering is when communication or data sharing is enabled between non-adjacent layers in the protocol stack in violation of the classic OSI model. One issue with known cross-layer architectures is that they do not support a network device having multiple applications interacting with multiple network interface cards. As such, there is a need for a cross-layer architecture for a network device having multiple applications interacting with multiple network interface cards.

SUMMARY OF THE INVENTION

The present invention provides a cross-layer architecture for a network device. In general, the network device includes a number of network interfaces each implementing a number of low level layers of a protocol stack and having a cross-layer agent associated with the low level layers of the protocol stack. The low level protocol stack layers may include a physical layer, a link layer, a network layer, and a protocol layer. The network device also includes an application based cross-layer agent associated with one or more high level protocol stack layers including an application layer. For example, the application layer may be a File Transfer Protocol (FTP) application. When the application layer desires to form a network connection to another network device, an arbitration agent operates to identify one of the network interfaces as a network interface for the network connection. Once the network interface is identified, the arbitration agent then effects interconnection of the application based cross-layer agent and the network based cross-layer agent of the network interface and interconnection of the high level protocol stack layers including the application layer and the low level protocol stack layers of the network interface, thereby forming a complete protocol stack having a cross-layer architecture for the network connection.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
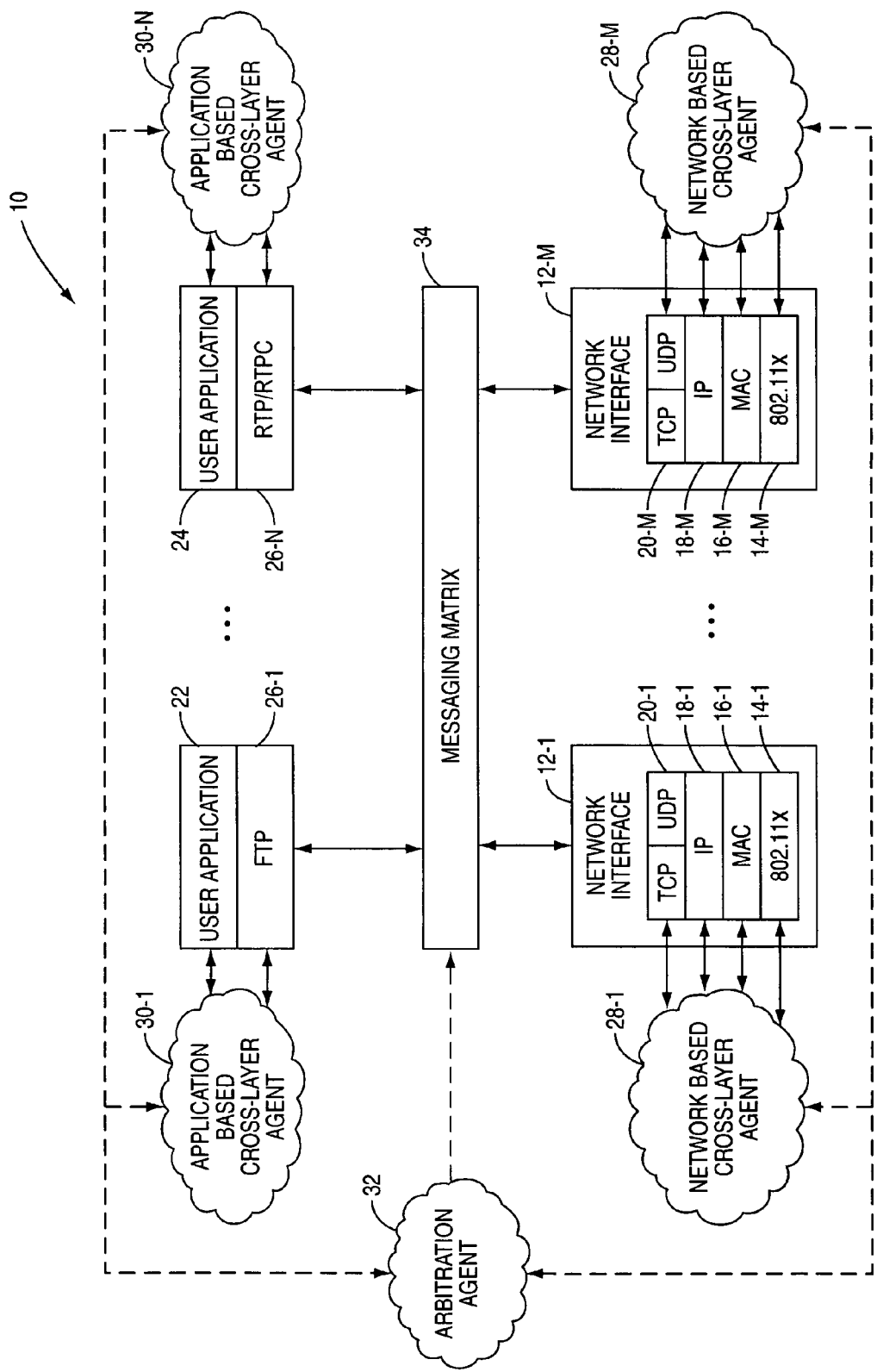
FIG. 1 illustrates an exemplary network device implementing the cross-layering architecture of the present invention.

The present invention relates to a cross-layer architecture for a network device having multiple applications and multiple network interfaces. An exemplary embodiment of a network device 10 incorporating the cross-layer architecture of the present invention is illustrated in FIG. 1. In general, the network device 10 includes a number of network interfaces 12-1 through 12-M. It is to be understood that the network device 10 includes two or more network interfaces 12-1, 12-M. The network interfaces 12-1, 12-M may be wireless network interfaces, wired network interfaces, or a combination thereof. Exemplary wireless network interfaces are wireless network interfaces operating according to one or more of the suite of IEEE 802.11 standards (Wi-Fi), IEEE 802.16 standards (WiMAX), IEEE 802.15 standards (Personal Area Networks including Bluetooth and Zigbee), or the like. Exemplary wired network interfaces include an Ethernet network interface, a modem, or the like.

According to the present invention, the protocol stack of the Open System Interconnect (OSI) model is segmented such that low level layers of the protocol stack are implemented on the network interfaces 12-1, 12-M. In this exemplary embodiment, the traditional protocol stack is segmented such that Layers 1-4 are implemented on the network interfaces 12-1, 12-M and all layers above and including Layer 5 are implemented, for example, in software executed by a control system of the network device 10. However, the present invention is not limited thereto. Segmentation of the protocol stack may occur at any desired point in the protocol stack. Further, the segmentation of the protocol stack may vary among the network interfaces 12-1, 12-M.

More specifically, in this embodiment, the network interface 12-1 implements low level protocol stack layers 14-1 through 20-1. The low level protocol stack layers 14-1 through 20-1 may be implemented in hardware, software, or a combination of hardware and software and include a physical layer 14-1, a link layer 16-1, a network layer 18-1, and a transport layer 20-1. The physical layer 14-1 is an IEEE 802.11x physical layer; the link layer 16-1 is a Media Access Control (MAC) layer; the network layer 18-1 is an Internet Protocol (IP) layer; and the transport layer 20-1 provides both a Transfer Control Protocol (TCP) service and a User Datagram Protocol (UDP) service. Likewise, the network interface 12-M implements low level protocol stack layers 14-M through 20-M. Note that IEEE 802.11x is used refer generically to any one of the suite of IEEE 802.11 standards.

The network device 10 also includes user applications 22, 24 and a number of Layer 7 applications 26-1 through 26-N. In general, the user applications 22, 24 may be any applications desiring use of one or more of the network interfaces 12-1, 12-M. Each of the user applications 22, 24 may be, for example, a web browser, an e-mail application, an application for synchronizing e-mail between the network device 10 and a secondary device such as a Personal Digital Assistant (PDA), an application for streaming digital video to other network devices, a peer-to-peer photo or video sharing application, or the like. In this exemplary embodiment, the Layer 7 application 26-1 is a File Transfer Protocol (FTP) application and is used by the user application 22. As discussed below in more detail, the FTP application 26-1 forms an application layer and may be coupled to one or more of the network interfaces 12-1, 12-M to form a complete protocol stack. In a similar fashion, the Layer 7 application 26-N is a Real-time Transfer Protocol (RTP) and RTP Control (RTPC) application used by the user application 24. The RTP/RTPC application 26-N forms an application layer and may be coupled to one or more of the network interfaces 12-1, 12-M to form a complete protocol stack.

To provide cross-layer functionality, the network device 10 also includes network based cross-layer agents 28-1 through 28-M associated with the network interfaces 12-1 through 12-M; application based cross-layer agents 30-1 through 30-N associated with the Layer 7 applications 26-1 through 26-N; an arbitration agent 32; and a messaging matrix 34. The network based cross-layer agents 28-1, 28-M are implemented on the network interfaces 12-1, 12-M in hardware, software, or a combination of hardware and software. The network based cross-layer agent 28-1 provides or facilitates information-sharing between and control of the low level protocol stack layers 14-1 through 20-1, as will be apparent to one of ordinary skill in the art upon reading this disclosure. In addition, as described below in more detail, the network based cross-layer agent 28-1 may be associated with the application based cross-layer agents 30-1, 30-N by the arbitration agent 32 and the messaging matrix 34 to facilitate information-sharing between and control of the low level protocol stack layers 14-1 through 20-1 and the upper protocol stack layers when desired.

In a similar fashion, the network based cross-layer agent 28-M provides or facilitates information-sharing between and control of the low level protocol stack layers 14-M through 20-M, as will be apparent to one of ordinary skill in the art upon reading this disclosure. In addition, as described below in more detail, the network based cross layer agent 28-M may be associated with the application based cross-layer agents 30-1, 30-N by the arbitration agent 32 and the messaging matrix 34 to facilitate information-sharing between and control of the low level protocol layers 14-M through 20-M and the upper protocol stack layers when desired.

The application based cross-layer agents 30-1 and 30-N are associated with, in this example, the FTP application 26-1 and the RTP/RTPC application 26-N, respectively, and operate to facilitate information-sharing and control between the protocol stack layers. The application based cross-layer agents 30-1 and 30-N are preferably implemented in software executed by a control system of the network device 10, but may alternatively be implemented in hardware or a combination of hardware and software.

The arbitration agent 32 is preferably implemented in software, but may alternatively be implemented in hardware or a combination of hardware and software. The arbitration agent 32 operates to associate the application based cross-layer agents 30-1, 30-N with one or more of the network based cross-layer agents 28-1, 28-M as needed. For example, if the user application 22 desires to transfer a file to another network device via the FTP application 26-1, the arbitration agent 32 may determine that the network interface 12-1 is capable of or preferred for providing a network connection to the other network device based on, for example, an IP address or Uniform Resource Locator (URL) of the other network device. Then, by controlling the messaging matrix 34, the arbitration agent 32 operates to interconnect the FTP application 26-1 and the network interface 12-1 and interconnect the application based cross-layer agent 30-1 and the network based cross-layer agent 28-1 to provide a complete protocol stack having a cross-layer architecture for the network connection.

The implementation of the messaging matrix 34 may depend on the particular implementation of the network device 10 and specifically the network interfaces 12-1, 12-M. The messaging matrix 34 may be implemented in software, hardware, or a combination of hardware and software. In operation, the messaging matrix 34 operates to interconnect the applications 26-1, 26-N of the upper protocol layers with the network interfaces and application based cross-layer agents 30-1, 30-N with the network based cross-layer agents 28-1, 28-M under the control of the arbitration agent 32.

Figure 2:
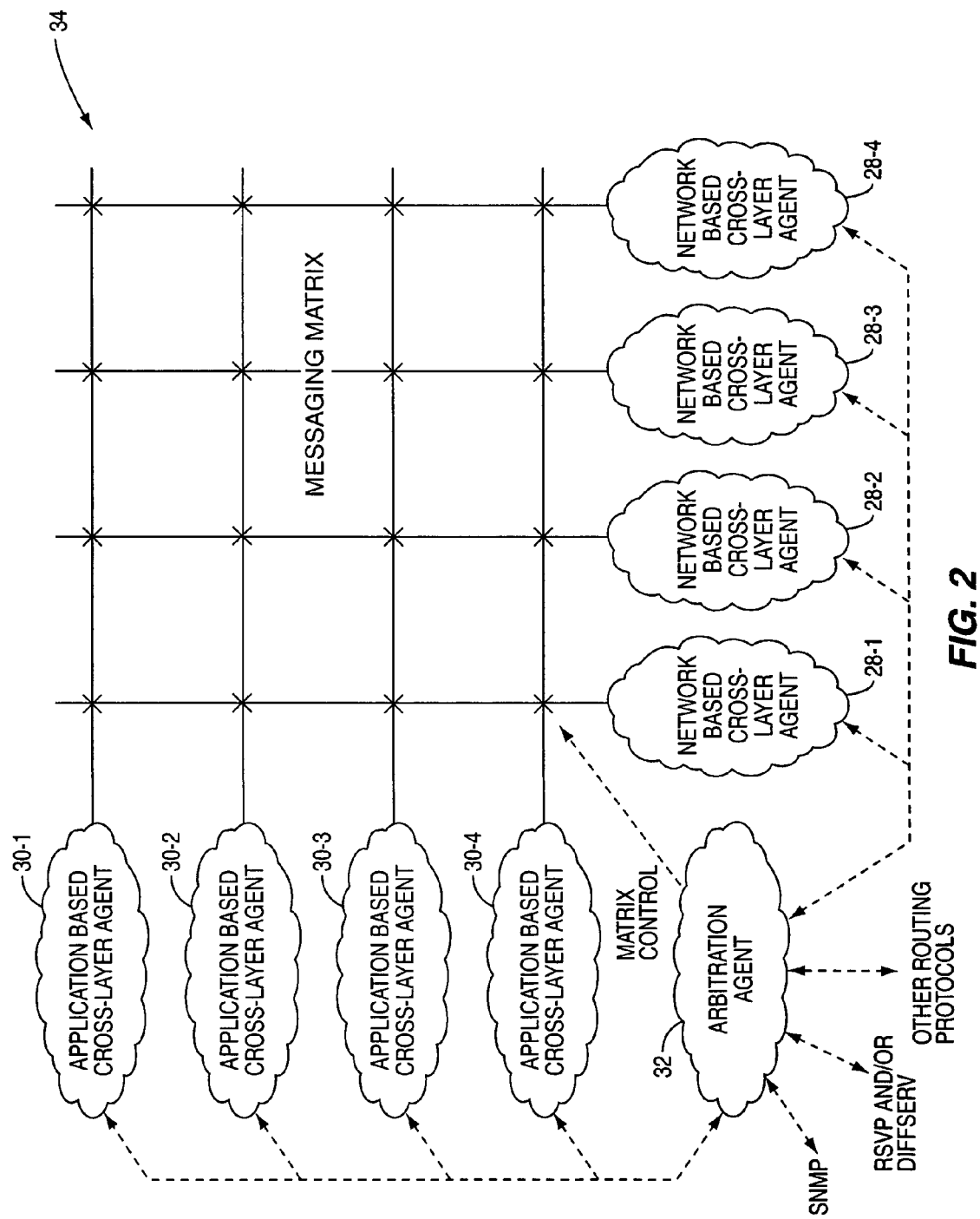
FIG. 2 illustrates the messaging matrix for interconnecting application based cross-layer agents and network based cross-layer agents according to one embodiment of the present invention.

FIG. 2 more specifically illustrates the operation of the arbitration agent 32 and the messaging matrix 34 to interconnect application based cross-layer agents 30-1 through 30-4 and network based cross-layer agents 28-1 through 28-4. Note that in this example, there are four application based cross-layer agents and four network based cross-layer agents. However, the present invention is not limited thereto. As illustrated, each "X" identifies a potential interconnection between one of the application based cross-layer agents 30-1, 30-2, 30-3, 30-4 and one of the network based cross-layer agents 28-1, 28-2, 28-3, 28-4. Thus, the arbitration agent 32 may control the messaging matrix 34 to interconnect the application based cross-layer agent 30-1 to any one or any combination of the network based cross-layer agents 28-1 through 28-4. Note that the application based cross-layer agent 30-1 may desirably be connected to more than one of the network based cross-layer agents 28-1 through 28-4 when, for example, the network device 10 operates according to the proposed IEEE 802.11n standard, which provides for Multiple Input Multiple Output (MIMO) operation. Likewise, for each of the other application based cross-layer agents 30-2 through 30-4, the arbitration agent 32 may control the messaging matrix 34 to interconnect the application based cross-layer agents 30-2 through 30-4 to one or more of the network based cross-layer agents 28-1 through 28-4 when desired.

Figure 3:
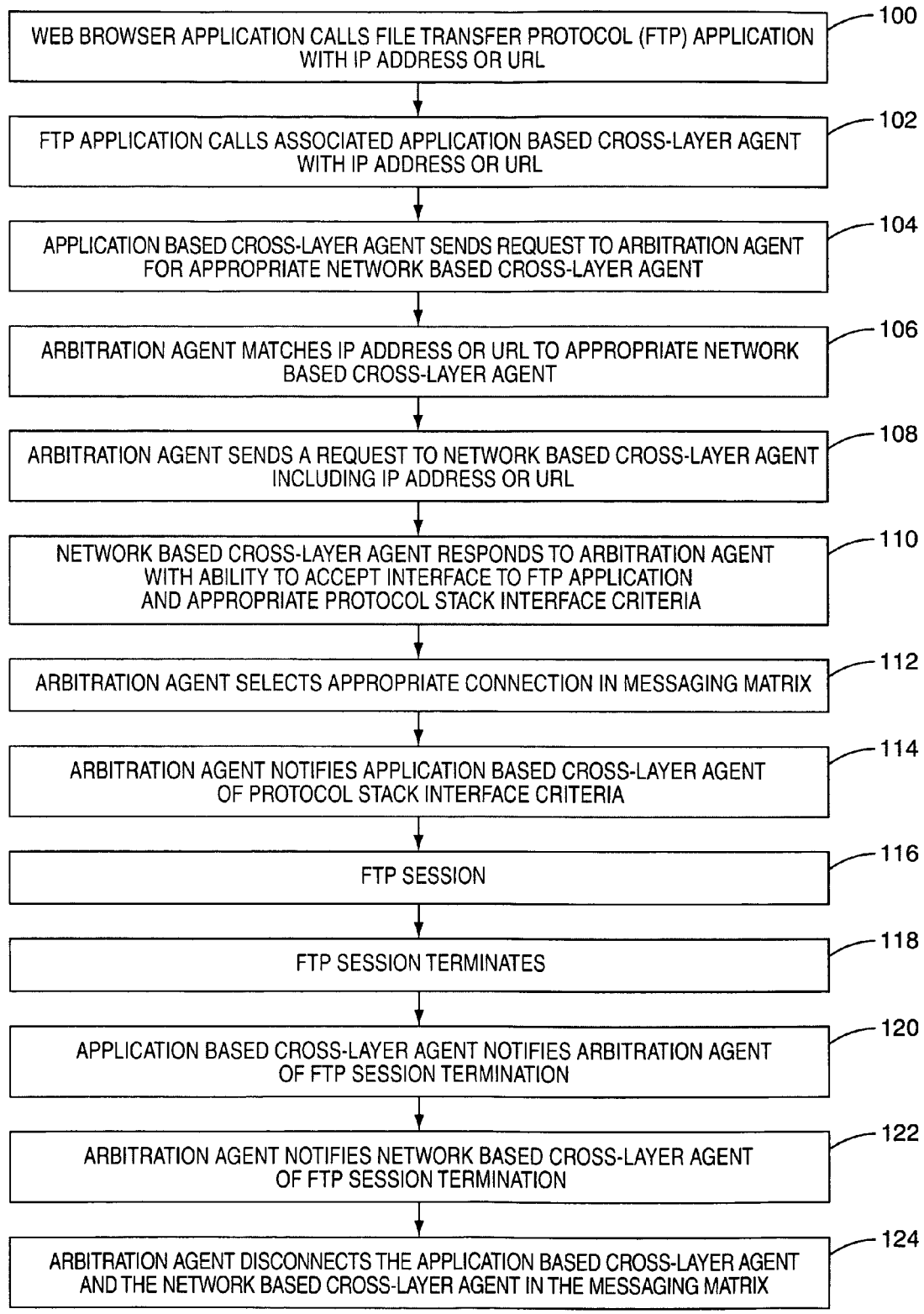
FIG. 3 is flowchart illustrating the operation of the network device according to an exemplary embodiment of the present invention.

FIG. 3 is a flow chart illustrating the operation of the network device 10 according to an exemplary embodiment of the present invention. In this example, the user application 22 is a web browser application. Operation begins when the web browser application 22 calls the FTP application 26-1 with an IP address or Uniform Resource Locator (URL) identifying another network device with which a network connection is desired (step 100). The FTP application 26-1 then calls the associated application based cross-layer agent 30-1 with the IP address or URL (step 102). In response, the application based cross-layer agent 30-1 sends a request including the IP address or URL to the arbitration agent 32 for an appropriate network based cross-layer agent 28-1, 28-M (step 104). The arbitration agent 32 matches the IP address or URL to one of the network based cross-layer agents 28-1, 28-M (step 106). More specifically, the arbitration agent 32 may determine which of the network interfaces 12-1, 12-M is capable of or is preferred for establishing a network connection with the other network device based on the IP address or URL of the other network device and associated network availability. Once the network device 12-1, 12-M is identified, the network based cross-layer agent 28-1, 28-M associated with the identified network interface 12-1, 12-M is identified as the desired network based cross-layer agent. In this example, the network based cross layer agent 28-1 is identified as the desired network based cross-layer agent.

The arbitration agent 32 then sends a request to the network based cross-layer agent 28-1 with the IP address or URL of the other network device (step 108). The network based cross-layer agent 28-1 sends a response to the arbitration agent 32 including information indicating whether the network interface 12-1 has the ability to accept an interface to the FTP application 26-1 and, if so, appropriate protocol stack interface criteria including data and messaging requirements for the interface between the protocol stack layers (step 110). The response may indicate whether the network interface 12-1 is currently in use such that bandwidth is unavailable or is limited. If the network interface 12-1 is currently in use, the arbitration agent 32 may determine a priority assigned to the current connection maintained by the network interface 12-1, a priority assigned to the desired transfer by the FTP application 26-1, and optionally other criteria such as an expected duration of the current network connection of the network interface 12-1 or the like. Depending on these factors, the arbitration agent 32 may determine whether to wait until the current network connection of the network interface 12-1 has been terminated or to immediately terminate the current network connection such that the FTP application 26-1 is given immediate access to the network interface 12-1.

In another embodiment, if the network interface 12-1 is in use, the arbitration agent 32 may interact with the network based cross-layer agent 28-1 to determine whether the network interface 12-1 has the ability to establish parallel communication channels. For example, if the network interface 12-1 is a wireless network interface, the arbitration agent 32 may determine whether the network interface 12-1 is capable of establishing two parallel wireless communication links on non-overlapping channels. If so, the arbitration agent 32 may operate such that the network interface 12-1 establishes a second, parallel communication link for the FTP application 26-1. If not, the arbitration agent 32 may operate such that the FTP application 26-1 waits until the network interface 12-1 is no longer in use or alternatively shares the bandwidth of the network interface 12-1 with the other application currently using the network interface 12-1.

In this example, the network interface 12-1 has the ability to accept an interface to the FTP application 26-1. Upon receiving the response, the arbitration agent selects an appropriate connection in the messaging matrix 34 to interconnect the application based cross-layer agent 30-1 to the network based cross-layer agent 28-1 (step 112). In addition, the messaging matrix 34 is controlled by the arbitration agent 32 to interconnect the FTP application 26-1 to the network interface 12-1.

At this point, the arbitration agent 32 may provide additional functionality by optimizing the cross-layer strategy. For example, the network interface 12-1 may be a wireless network interface operating according to one of the suite of IEEE 802.11 standards. Based on the IP address or URL and information from the network based cross-layer agent 28-1, the arbitration agent 32 may determine that the other network device identified by the IP address or URL is within a local wireless coverage area of the network interface 12-1 such that a direct point-to-point wireless connection may be established between the two network devices. Thus, in order to provide a more efficient transfer, the arbitration agent 32 may interact with the network based cross-layer agent 28-1 and optionally the application based cross-layer agent 30-1 to bypass, for example, the transport layer 20-1 and the network layer 18-1.

Once the appropriate connection in the messaging matrix 34 is made, the arbitration agent 32 notifies the application based cross-layer agent 30-1 of the protocol stack interface criteria (step 114), and an FTP session is established via the FTP application 26-1 and the network interface 12-1 (step 116). In the situation where the transport layer 20-1 and the network layer 18-1 are bypassed, the arbitration agent 32 may monitor the performance of the network interface 12-1 during the FTP session. If the performance of the network interface 12-1 is less than desired, the arbitration agent 32 may interact with the network based cross-layer agent 28-1 and optionally the application based cross-layer agent 30-1 such that the transport layer 20-1 and the network layer 18-1 are no longer bypassed.

When the FTP session terminates (step 118), the application based cross-layer agent 30-1 notifies the arbitration agent 32 of the termination of the FTP session (step 120). Then, the arbitration agent 32 notifies the network based cross-layer agent 28-1 of the termination of the FTP session (step 122) and disconnects the application based cross-layer agent 30-1 and the network based cross-layer agent 28-1 in the messaging matrix 34 (step 124).

Figure 4:
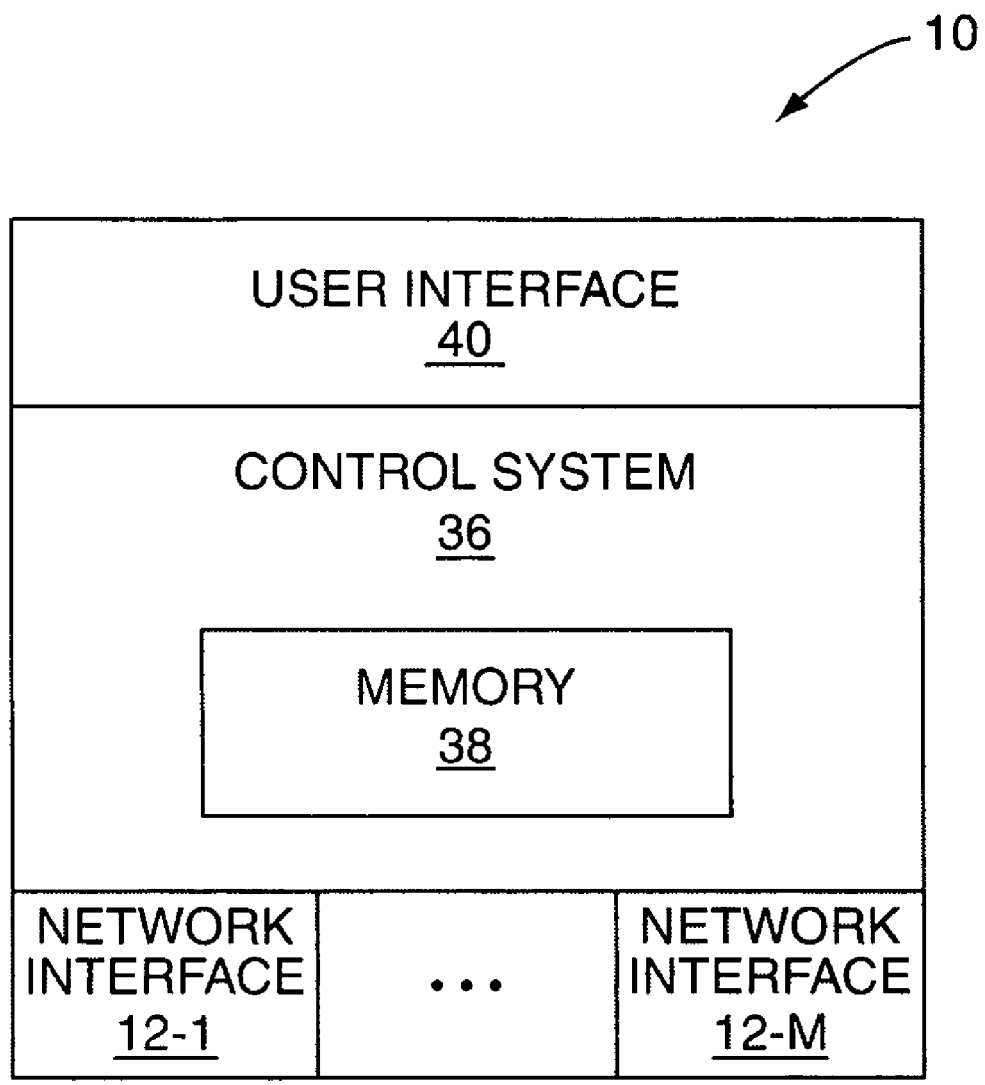
FIG. 4 is a block diagram of the network device of FIG. 1.

FIG. 4 is a block diagram of an exemplary embodiment of the network device 10. In general, the network device 10 includes a control system 36 having associated memory 38. The control system 36 may include hardware, software, or a combination of hardware and software and is not intended to be limited to a central processing unit. In this example, the user applications 22, 24, the applications 26-1 through 26-N, the application based cross-layer agents 30-1 through 30-N, the arbitration agent 32, and the messaging matrix 34 are implemented in software and stored in the memory 38. However, as discussed above, the present invention is not limited thereto. More specifically, the application based cross-layer agents 30-1 through 30-N, the arbitration agent 32, and the messaging matrix 34 may each be implemented in the control system 36 as software, hardware, or a combination of hardware and software. The network device 10 also includes the network interfaces 12-1 through 12-M. As discussed above, the network interfaces 12-1, 12-M implement low level protocol stack layers 14-1 through 20-1 and 14-M through 20-M. The low level protocol stack layers 14-1 through 20-1 and 14-M through 20-M are preferably implemented in hardware, but may alternatively be implemented in a combination of hardware and software. In addition, the network interfaces 12-1, 12-M preferably include the network based cross-layer agents 28-1 and 28-M, respectively, which may be implemented in hardware or a combination of hardware and software. The network device 10 may also include a user interface 40.

Those skilled in the art will recognize improvements and modifications to the preferred embodiments of the present invention. All such improvements and modifications are considered within the scope of the concepts disclosed herein and the claims that follow.

What is claimed is:

1. A network device comprising:
a plurality of network interfaces each implementing at least one low level protocol stack layer and comprising a network based cross-layer agent associated with the at least one low level protocol stack layer; and
a control system associated with the plurality of network interfaces and comprising:
an application based cross-layer agent associated with at least one high level protocol stack layer including an application layer, the application based cross-layer agent adapted to obtain information identifying a second network device with which the application layer desires to establish a network connection and provide the information identifying the second network device to an arbitration agent; and
the arbitration agent adapted to:
identify the one of the plurality of network interfaces as a network interface for establishing a network connection with the second network device based on the information identifying the second network device;
effect interconnection of the at least one high level protocol stack layer and the one of the plurality of network interfaces identified as the network interface for establishing the network connection with the second network device; and
effect interconnection of the network based cross-layer agent of the one of the plurality of network interfaces identified as the network interface for establishing the network connection with the second network device and the application based cross-layer agent for a duration of the network connection, thereby providing a complete protocol stack having a cross-layer architecture for the network connection.

2. The network device of claim 1 wherein the plurality of network interfaces are a plurality of network interface cards.

3. The network device of claim 2 wherein for each one of the plurality of network interface cards, the network based cross-layer agent is implemented on the one of the plurality of network interface cards.

4. The network device of claim 1 wherein the at least one low level protocol stack layer comprises a physical layer, a link layer, a network layer, and a transport layer, and the at least one high level protocol stack layer comprises protocol stack layers above the transport layer including the application layer.

5. The network device of claim 1 wherein the control system further comprises a messaging matrix controlled by the arbitration agent, wherein the arbitration agent is further adapted to control the messaging matrix to effect interconnection of the at least one high level protocol stack layer and the one of the plurality of network interfaces identified as the network interface for establishing the network connection with the second network device and effect interconnection of the network based cross-layer agent of the one of the plurality of network interfaces identified as the network interface for establishing the network connection with the second network device and the application based cross-layer agent for a duration of the network connection.

6. The network device of claim 1 wherein the control system further comprises:
a plurality of application based cross-layer agents including the application based cross-layer agent each associated with at least one high level protocol stack layer including a corresponding one of a plurality of application layers including the application layer; and
a messaging matrix controlled by the arbitration agent and adapted to interconnect select ones of the plurality of application based cross-layer agents and the network based cross-layer agents of the plurality of network interfaces.

7. A method of operation of a network device to interconnect an application based cross-layer agent and one of a plurality of network based cross-layer agents in the network device, the application based cross-layer agent associated with at least one high level protocol stack layer including an application layer and the plurality of network based cross-layer agents each associated with at least one low level protocol stack layer of a corresponding one of a plurality of network interfaces, comprising:
obtaining information identifying a second network device with which the application layer desires to establish a network connection;
identifying a one of the plurality of network interfaces as a network interface for establishing the network connection;
interconnecting the at least one high level protocol stack layer and the at least one low level protocol stack layer of the one of the plurality of network interfaces identified as the network interface for establishing the network connection; and
interconnecting the application based cross-layer agent and the one of the plurality of network based cross-layer agents associated with the at least one low level protocol stack layer of the one of the plurality of network interfaces during the network connection such that a complete protocol stack having a cross-layer architecture is provided for the network connection.

8. The method of claim 7 wherein interconnecting the application based cross-layer agent and the one of the plurality of network based cross-layer agents comprises controlling a messaging matrix to interconnect the one of the plurality of network based cross-layer agents and the application based cross-layer agent.

9. The method of claim 7 wherein the at least one low level protocol stack layer comprises a physical layer, a link layer, a network layer, and a transport layer, and interconnecting the at least one high level protocol stack layer to the at least one low level protocol stack layer comprises interconnecting the at least one high level protocol stack layer to the transport layer of the one of the plurality of network interfaces.

10. The method of claim 7 wherein the network device further comprises a plurality of application based cross-layer agents including the application based cross-layer agent each associated with at least one high level protocol stack layer including a corresponding application layer, and interconnecting the application based cross-layer agent and the one of the plurality of network based cross-layer agents comprises controlling a messaging matrix adapted to interconnect select ones of the plurality of network based cross-layer agents and the plurality of application based cross-layer agents.

11. A system for interconnecting an application based cross-layer agent and one of a plurality of network based cross-layer agents in a network device, the application based cross-layer agent associated with at least one high level protocol stack layer including an application layer and the plurality of network based cross-layer agents each associated with at least one low level protocol stack layer of a corresponding one of a plurality of network interfaces, comprising:

means for obtaining information identifying a second network device with which the application layer desires to establish a network connection;

means for identifying a one of the plurality of network interfaces as a network interface for establishing the network connection;

means for interconnecting the at least one high level protocol stack layer and the at least one low level protocol stack layer of the one of the plurality of network interfaces identified as the network interface for establishing the network connection; and means for interconnecting the application based cross-layer agent and the one of the plurality of network based cross-layer agents associated with the at least one low level protocol stack layer of the one of the plurality of network interfaces during the network connection such that a complete protocol stack having a cross-layer architecture is provided for the network connection.

12. The system of claim 11 wherein the means for interconnecting the application based cross-layer agent and the one of the plurality of network based cross-layer agents comprises a means for controlling a messaging matrix to interconnect the one of the plurality of network based cross-layer agents and the application based cross-layer agent.

13. The system of claim 11 wherein the at least one low level protocol stack layer comprises a physical layer, a link layer, a network layer, and a transport layer, and the means for interconnecting the at least one high level protocol stack layer to the at least one low level protocol stack layer interconnects the at least one high level protocol stack layer to the transport layer of the one of the plurality of network interfaces.

14. The system of claim 11 wherein the network device further comprises a plurality of application based cross-layer agents including the application based cross-layer agent each associated with at least one high level protocol stack layer including a corresponding application layer, and the means for interconnecting the application based cross-layer agent and the one of the plurality of network based cross-layer agents comprises a means for controlling a messaging matrix adapted to interconnect select ones of the plurality of network based cross-layer agents and the plurality of application based cross-layer agents.

\* \* \* \* \*